United States Patent
Bang et al.

(10) Patent No.: US 9,886,139 B2
(45) Date of Patent: Feb. 6, 2018

(54) TOUCHLESS USER INTERFACE USING VARIABLE SENSING RATES

(71) Applicant: Elliptic Laboratories AS, Oslo (NO)

(72) Inventors: Hans Jørgen Bang, Oslo (NO); Tobias Gulden Dahl, Oslo (NO)

(73) Assignee: ELLIPTIC LABORATORIES AS, Oslo (NO)

(*) Notice: Subject to any disclaimer, the term of this patent is extended or adjusted under 35 U.S.C. 154(b) by 101 days.

(21) Appl. No.: 14/476,455

(22) Filed: Sep. 3, 2014

(65) Prior Publication Data

US 2014/0368472 A1    Dec. 18, 2014

Related U.S. Application Data

(63) Continuation of application No. PCT/GB2013/050533, filed on Mar. 5, 2013.

(30) Foreign Application Priority Data

Mar. 5, 2012 (GB) .................................. 1203830.3

(51) Int. Cl.
*G06F 3/042* (2006.01)
*G06F 3/0488* (2013.01)
(Continued)

(52) U.S. Cl.
CPC .......... *G06F 3/0421* (2013.01); *G06F 1/3231* (2013.01); *G06F 1/3262* (2013.01);
(Continued)

(58) Field of Classification Search
CPC ..... G06F 3/0416; G06F 3/04886; G06F 3/016
See application file for complete search history.

(56) References Cited

U.S. PATENT DOCUMENTS

2007/0120834 A1* 5/2007 Boillot .................... G06F 3/016
345/173
2009/0207154 A1* 8/2009 Chino ................... G06F 3/0416
345/175
(Continued)

FOREIGN PATENT DOCUMENTS

WO   2009/115799   9/2009
WO   2011/036486   3/2011

OTHER PUBLICATIONS

International Search Report dated Oct. 22, 2013 from International Application No. PCT/GB2013/050533.
(Continued)

*Primary Examiner* — Sepehr Azari
(74) *Attorney, Agent, or Firm* — Beyer Law Group LLP

(57) ABSTRACT

An electronic device includes a touchless user interface comprising:
transmitting means 7 for transmitting signals,
receiving means 9a-9f for receiving reflected signals after reflection of said signals from an input object,
processing means for determining information regarding the position and/or movement of the input object from the reflected signals to provide a user input to the device; and
a screen 2 for displaying a graphical object 4, 6 having one or more associated interactions with which a user can interact with said graphical object 4, 6 through a said user input.
The device is arranged so that the signals transmitted by the transmitting means 7 and/or the reflected signals processed by the processing means are determined by the location of the graphical object 4, 6 on the screen 2 and/or by the interaction(s).

27 Claims, 4 Drawing Sheets

(51) Int. Cl.
*G06F 1/32* (2006.01)
*G06F 3/043* (2006.01)
*G06F 3/041* (2006.01)

(52) U.S. Cl.
CPC ............ *G06F 3/043* (2013.01); *G06F 3/0416* (2013.01); *G06F 3/04883* (2013.01); *G06F 2203/04108* (2013.01); *Y02B 60/1289* (2013.01)

(56) References Cited

U.S. PATENT DOCUMENTS

| | | |
|---|---|---|
| 2010/0182332 A1 | 7/2010 | Ozawa et al. |
| 2010/0245289 A1 | 9/2010 | Svajda |
| 2010/0265209 A1 | 10/2010 | Nurmi et al. |
| 2011/0037576 A1 | 2/2011 | Jeon et al. |
| 2011/0279393 A1 | 11/2011 | Okada et al. |
| 2012/0242591 A1* | 9/2012 | Kawalkar ........... G06F 3/04886 345/173 |

OTHER PUBLICATIONS

Written Opinion dated Oct. 22, 2013 from International Application No. PCT/GB2013/050533.

\* cited by examiner

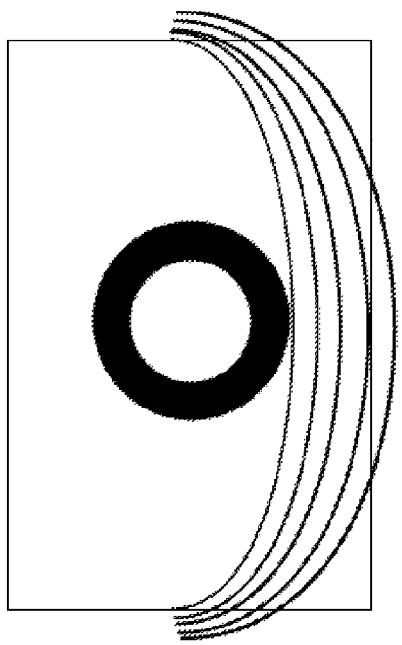
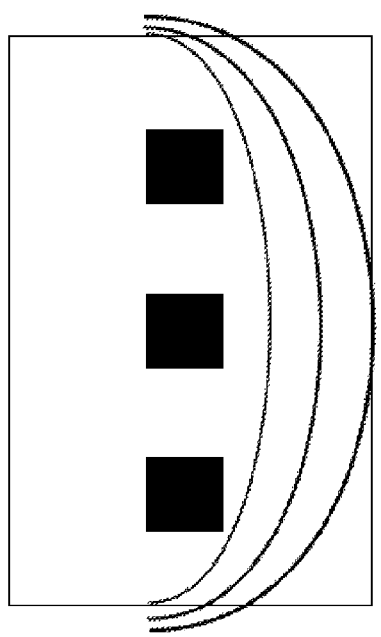
Fig 4

TOUCHLESS USER INTERFACE USING VARIABLE SENSING RATES

This invention relates to electronic devices including a touchless user interface; that is a user interface in which one or more features of the device can be controlled through appropriate positioning or movements of an input object—typically part of a user's body such as a hand.

In previous proposals the approach taken to such a user interface has been to treat it as akin to other more conventional user input devices such as a keyboard, mouse, trackpad etc. This means that signals are transmitted, reflected from the input object and the reflections analysed to determine where the input object is and/or how it is moving and to translate that, if appropriate, to a particular user input to pass up to whatever software application happens to be running.

However the Applicant has recognised that in some circumstances improvement on such an arrangement can be made.

When viewed from a first aspect the invention provides an electronic device including a touchless user interface comprising:
  transmitting means for transmitting signals,
  receiving means for receiving reflected signals after reflection of said signals from an input object,
  processing means for determining information regarding the position and/or movement of said input object from said reflected signals to provide a user input to the device; and
  a screen for displaying a graphical object having one or more associated interactions with which a user can interact with said graphical object through a said user input,
  wherein the device is arranged so that processing means processes only a subset of the reflected signals as required by the location of said graphical object on said screen and/or by said interaction(s).

Thus it will be seen by those skilled in the art that in accordance with the invention, rather than analysing all of the received signals, it is only necessary to analyse a subset of the data available from the received signals depending upon the interaction(s) available to the user. This stems from an appreciation that the type of interaction and/or the location of the graphical object on the screen can be used to 'rule out' some of the received signals as unnecessary without even processing them.

As will be appreciated having the high level graphical user interface feed back to the low-level input processing module to determine which received signals to process is somewhat unconventional and contrasts with the conventional approach of analysing the input medium for all possible inputs and passing those received to the application. However it is advantageous in many applications since it can yield a significant saving in processor usage. This clearly has benefits in mobile devices in particular in extending battery life. It may also give a lower maximum processor requirement if the device is arranged such that it is never necessary to analyse the whole of the sensing space at once even if all parts of it may be used at different times.

In one set of embodiments, the smaller subset of reflected signals which is determined by the graphical object of the user interface is realised by processing only signals received by a subset of the receivers (where a plurality of receivers is provided). In an overlapping set of embodiments the device is arranged to process only signals received within time constraints.

The nature of the interaction(s) associated with the graphical object which are available to the user may at least partly determine the subset of reflected signals to be processed. For example the Applicant has recognised that depending on the nature of the interaction offered by the user interface, there may be differing requirements for the spatial and/or temporal resolution required in order to determine the corresponding input. For example a menu GUI element might require a fine resolution to allow the touchless interface to determine which of several menu options the user wishes to select, whilst a volume control might simply require a determination as to whether a significant leftwards or a significant rightwards movement is being made in order to lower or raise volume respectively. If an interaction associated with a graphical object requires only relatively crude resolution it may be possible to disregard reflected signals received by some of the receivers if the signals received by the remainder are adequate to determine the input. For example receivers might be spaced around a screen but for some interactions only signals from alternating receivers are processed. Although this might reduce spatial resolution, where this was not important for the particular interaction, the benefits in terms of reduced processing as set out above can be enjoyed.

An example of applying time constraints to determine the subset of reflected signals to process would be to process only the reflections from some transmitted signals (or pings). For example for some interactions it might be sufficient to process signals reflected after alternating pings. Although this might reduce temporal resolution, where this was not important for the particular interaction, the benefits in terms of reduced processing as set out above can be enjoyed.

In a set of embodiments the nature of the interaction is also used to determine the type of processing applied to signals received. This may give performance advantages where some interactions can be successfully detected using less processor-intensive algorithms and also where some algorithms give better detection of some interactions than others.

One of the factors might be the speed at which a user movement is executed; some algorithms are suited to detecting fast, broad gestures whereas others are suited to slower, more intricate movements. For example for graphical objects which have interactions that require (or accept) very fast movements the apparatus could be configured to identify similar patterns in the signals received in different channels (transmitter-receiver pairings) and to infer movement from timing differences between the patterns in the channels. Such an approach is described in more detail in WO 2011/036486, the contents of which are incorporated herein by reference. Such an approach might be used for example where a graphical object allowed a left or right sweep gesture to turn over a page on a e-book or navigate along a series of photos, music tracks etc.

In contrast slow movements can be detected more successfully by applying line filters directly on an impulse response image as is described in greater detail in WO 2009/115799. This approach allows the phase information in the received signals to be exploited and so very fine motions can be resolved. It could therefore be used for example to process the interactions available in a more complex application such as a photo editing application where a number of different inputs corresponding to different gestures are possible.

In an intermediate example suited to interactions which are executed at a medium to fast speed, line filters might be applied to the absolute value of an impulse response image as is also described in WO 2009/115799. This could be used for example to control a slider or rotary control object.

As well as the speed of a gesture, another factor affecting the suitability of particular processing algorithms is the shape of the user's hand which the gesture dictates. For example for broad hand sweep, the shape of the hand may not be of too great an importance suggesting an algorithm which responds to gross movements such as that described in WO 2011/036486 mentioned above, whereas for fine tracking (e.g. as might be used in a drawing application or for selecting text in a mail application) simple ellipse intersection could be used on the assumption that the user's finger will be extended and so provide a strong point-like reflector which can be easily separated from the rest of the hand.

Tailoring the type of processing applied to inputs based on the available interactions is novel and inventive in its own right and thus when viewed from a second aspect the invention provides an electronic device including a touchless user interface comprising:

transmitting means for transmitting signals,
receiving means for receiving reflected signals after reflection of said signals from an input object,
processing means for determining information regarding the position and/or movement of said input object from said reflected signals to provide a user input to the device; and
a screen for displaying a graphical object having one or more associated interactions with which a user can interact with said graphical object through a said user input,
wherein the device is arranged so that processing means processes the reflected signals using a different algorithm depending on the location of said graphical object on said screen and/or by said interaction(s).

As well as the nature of the interaction available, the location of the graphical object on the screen can also be used to reduce the amount of processing of reflected signals. Again this could, in a set of embodiments, be realised by processing only reflected signals received by a subset of the receivers (where a plurality of receivers is provided)—e.g. those receivers located physically closest to the graphical object on the screen. In an overlapping set of embodiments the device is arranged to process only signals received within time constraints based on the location of the graphical object.

In a preferred set of such embodiments the device is arranged to process only received signals which have been reflected from the input object when it is in a predetermined sensing space associated with the graphical object. The processed signals will in this case be those corresponding to a time of flight consistent with reflection from an input object in the sensing space). As well as reducing the amount of processing required, such embodiments of the invention can also give more reliable input recognition since the smaller sensing space also reduces the effect of localised noise or background echoes.

The predetermined sensing space may conveniently correspond to the space above the graphical object on the screen. The size and/or shape of the sensing space may depend on the size and/or nature of the graphical object. For example a virtual button may have a relatively small, round sensing space, whereas a virtual slider may have a larger, elongate sensing space associated with it.

A single sensing space may be defined or a plurality may be defined depending on the graphical objects displayed on the screen. There may be one sensing space for each individual graphical object or a sensing space could be associated with a plurality of graphical objects—for example a keypad for entering numbers might be associated with a single sensing space whilst a slider is associated with another, separate sensing space.

The graphical object discussed herein is not limited to any particular type, It could be a graphical user interface object such as a virtual button, keypad, icon, slider, wheel or the like. Equally however it could comprise actual content such as a window, picture, video, page etc. which has interactions associated with it such as to turn a page, zoom, skip to next picture, fast forward etc.

The Applicant has recognised that it is potentially advantageous to limit which of the received reflected signals are processed based on the location of graphical objects and/or the nature of available interactions associated with them to reduce the amount of processing required. However it has further recognised that these factors can be taken into account on the transmit side too to improve performance and/or reduce power consumption. For example certain interactions may require a lower update rate so that transmissions (pings) can be made less frequently. Similarly some interactions may not require all of the transmitters to be used (if more than one is provided), e.g. depending upon the location of the graphical object on the screen or the spatial resolution required.

In addition to the improvement in performance and battery life which can be achieved by making fewer and/or lower power transmissions, there is a further advantage in terms of the impact of the device's transmissions on other devices in the vicinity. As the adoption of ultrasonic based touchless interfaces increases, any overall reduction in transmission is beneficial to all devices by alleviating the extent to which they must deal with interference.

Thus in a set of embodiments the device is arranged to control the transmitting means to alter the transmission of said signals according to the location of a graphical object on the screen and/or by the available interaction(s) associated with said graphical object.

This is novel and inventive in its own right and thus when viewed from a third aspect the invention provides an electronic device including a touchless user interface comprising:

transmitting means for transmitting signals,
receiving means for receiving reflected signals after reflection of said signals from an input object,
processing means for determining information regarding the position and/or movement of said input object from said reflected signals to provide a user input to the device; and
a screen for displaying a graphical object having one or more associated interactions with which a user can interact with said graphical object through a said user input,
wherein the device is arranged so that the signals transmitted by the transmitting means are determined by the location of said graphical object on said screen and/or by said interaction(s).

In one set of embodiments the transmitting means is controlled to alter the rate at which transmissions are made. In an overlapping set of embodiments the transmitting means is controlled to alter which of a plurality of transmitters is used to transmit.

It will be appreciated by those skilled in the art that a reduction in the quantity of transmissions will have a beneficial impact on the amount processing of reflected signals received which is required and on the level of interference experienced by nearby devices, even without employing the first aspect of the invention. It is however envisaged of course that the first aspect of the invention and any or all of its optional features may be employed in conjunction with this aspect of the invention.

The previous aspects of the invention in fact reflect the same generic inventive concept of using knowledge of the interactions available to a user through a graphical object to limit what the touchless interface must do to recognise appropriate inputs.

Thus when viewed from a fourth aspect, the invention provides an electronic device including a touchless user interface comprising:

transmitting means for transmitting signals, receiving means for receiving reflected signals after reflection of said signals from an input object, processing means for determining information regarding the position and/or movement of said input object from said reflected signals to provide a user input to the device; and a screen for displaying a graphical object having one or more associated interactions with which a user can interact with said graphical object through a said user input, wherein the device is arranged so that the signals transmitted by the transmitting means and/or the reflected signals processed by the processing means are determined by the location of said graphical object on said screen and/or by said interaction(s).

The Applicant has further appreciated that knowledge of the location of a graphical object on the screen can also be exploited to use resources more efficiently inbetween user inputs being given. More specifically in a set of embodiments the device is arranged to alter the transmission of signals and/or the processing of received signals depending on whether or not said input object is determined to be within a predetermined vicinity of said graphical object. This could be realised by altering the number of reflected signals processed but in a preferred set of such embodiments the device is arranged to alter the rate at which it transmits signals in dependence on whether an input object is determined to be within a predetermined vicinity of said graphical object. This allows a low background ping rate to be used (e.g. just sufficient to determine proximity) but for a higher rate to be used if the input object is detected near the graphical object. This can give a significant saving in power and reduction in interference experienced by nearby devices as previously mentioned.

When viewed from a fifth aspect the invention provides an electronic device including a touchless user interface comprising:

transmitting means for transmitting signals, receiving means for receiving reflected signals after reflection of said signals from an input object, processing means for determining information regarding the position and/or movement of said input object from said reflected signals to provide a user input to the device; and a screen for displaying a graphical object having one or more associated interactions with which a user can interact with said graphical object through a said user input, wherein the device is arranged to increase a rate at which the signals are transmitted by the transmitting means if said input object is determined to be within a predetermined vicinity of said screen or a graphical object on said screen.

The predetermined vicinity could be simply a predetermined distance from part or any of the screen or graphical object, or a more complex vicinity zone could be defined.

The device could be arranged so that signals are only transmitted when the input object is detected in the predetermined vicinity—i.e. the rate of transmission is increased from zero when the input object is detected. In such embodiments a separate means of determining whether the input object is in the predetermined vicinity will be required. This could be achieved by any suitable system such as capacitive, infra-red, optical or another, independent, ultrasound system.

In a set of preferred embodiments however the device is arranged to have a first transmission rate when no input object is determined to be within the predetermined vicinity and a second, higher transmission rate when the input object is determined to be within the predetermined vicinity. This allows a saving in power without additional complexity.

In a preferred set of embodiments the device is arranged so that it will only analyse the received signals to determine whether a user input has been made after it has established that an input object is in the predetermined vicinity. This allows a power saving not only on the transmit side by making fewer transmissions but also on the receive side by carrying out less processing.

The device is preferably arranged to reduce the transmission rate again once the input object is no longer in the predetermined vicinity. A time threshold could be applied to this to accommodate short excursions from the predetermined vicinity.

The invention is not limited to the provision of single predetermined vicinity: a plurality could be provided each with an associated transmission rate so that the increase in resolution is graduated. The transmission rate could even be arranged to increase continuously with distance.

In some embodiments of this aspect of the invention the predetermined vicinity is defined relative to the screen of to a predetermined part thereof. In other embodiments it is defined relative to a graphical object on the screen, or part thereof, with which the user can interact. This has the advantages described previously of allowing the dynamic resolution feature discussed here to be controlled by the user interface which means that the additional power is only used when the input object is in the 'right' place for the permitted gestures.

The invention extends in all its aspects to corresponding methods of operating an electronic device and to computer software having logic or instructions adapted to cause an electronic device to have the features recited herein or to carry out a method as recited herein when the software is executed.

Certain preferred embodiments of the invention will now be described, by way of example only, with reference to the accompanying drawings in which:

FIG. 4 is a flowchart describing a possible operation of the embodiment illustrated in FIG. 2.

Figure 1:
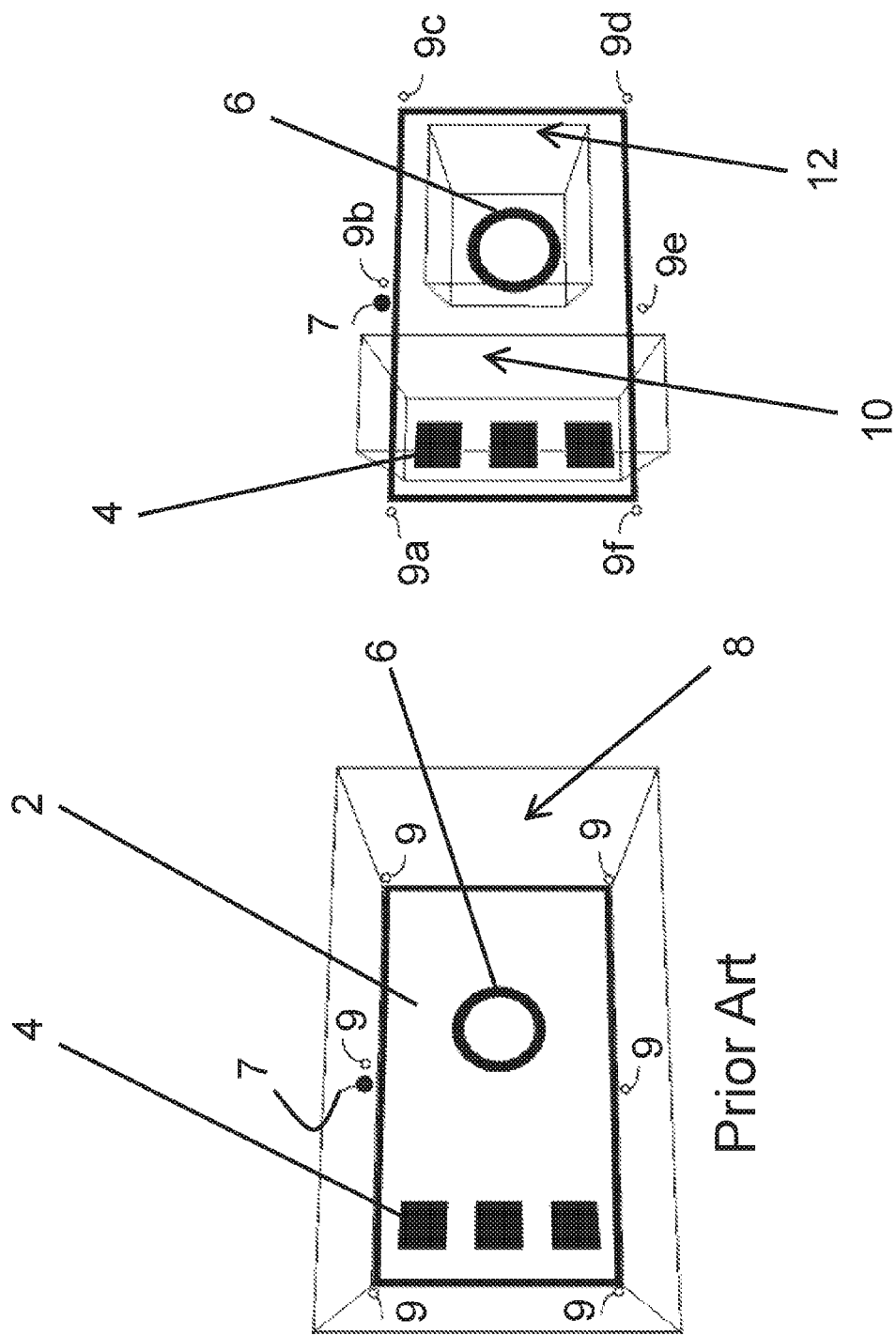
FIG. 1 is a schematic comparison of a user interface in accordance of the invention with a prior art user interface.

FIG. 1 shows schematically a device having a screen 2 on which are displayed graphical user objects 4, 6 with which a user can interact touchlessly. The graphical objects comprise a menu 4 consisting of three buttons and a virtual wheel 6 which might be used to control volume, navigate through a large number of items etc.

In each case the device has a touchless user interface 5 which comprises an ultrasonic transmitter 7 and a plurality of ultrasonic receivers 9 located around the edge of the screen 2. The transmitter 7 sends out a series of pulses or chirps which are reflected off any close-by objects and received by the receivers 9 and processed by internal processors applying pulse compression and impulse response image analysis techniques. Further details of how such interfaces are implemented can be found for example in WO 2009/147398, WO 2009/115799 and WO 2011/036486. Furthermore the type of processing algorithm applied may depend on the graphical objects and their available interactions as explained further below.

In the prior art arrangement on the left of FIG. 1, the touchless interface defines a sensing space 8 which covers the whole of the screen 2, requiring signals received by all the receivers 9 to be processed. This allows a user input to be received in respect of any of the graphical objects 4,6. Once a user input is detected by the touchless interface module, this is passed to the software application running just as a keystroke or a mouse click would be, and the software application then takes appropriate action according to whatever action has been programmed for that input. In this arrangement graphical objects having associated user interaction can be placed anywhere on the screen and the underlying software application will take appropriate action if a suitable input is detected.

In accordance with the present invention however, instead of a sensing space corresponding to the whole screen 2, two separate and discrete sensing spaces 10, 12 are defined corresponding to the menu graphical object 4 and the wheel graphical object 6 respectively. These smaller sensing spaces 10, 12 could be defined by using only the receivers closest to them—i.e. not processing the reflected signals received from other receivers. For example receiver 9a, 9b, 9e and 9f might be used for the leftmost sensing space 10 and receivers 9b, 9c, 9d and 9e used for the rightmost sensing space. This means that if a software application provides the menu 4 in a particular mode but not the wheel 6, the signals received by receivers 9c and 9d need not be processed at all. Conversely if the wheel 6 is made available by an application but not the menu 4, the receivers 9a and 9f might be de-activated.

In a variant of this it might be that the menu 4 requires only relatively crude spatial resolution such that only two receivers—e.g. 9a and 9f—are used, whereas the wheel 6 might require finer resolution such that three or four receivers 9b-9e are used. Of course if both objects 4, 6 are activated by an application all the receivers 9a-9f might be used.

Additionally or alternatively as well as associating different receivers with the different sensing spaces 10, 12 They could also be defined by processing only certain parts of the signals received at a given receiver—e.g. processing just the parts of the signal consistent with a time of flight of a signal reflected from an input object in the respective sensing space. A combination of these could be employed. Equally if multiple transmitters were available on the device some of these may not be needed to implement the sensing spaces 10, 12 shown. By reducing the amount of processing necessary, the amount of power used is reduced. It may also help to increase the accuracy of gesture recognition. By reducing the number of transmitters used, less ultrasonic energy is transmitted into the environment. This is beneficial to other devices employing ultrasound since it reduces the problem of dealing with interfering signals.

Additionally or alternatively the way in which the reflected signals are processed may be tailored in ways other than which parts of the signal are processed. For example the signals from the sensing space 10 above the menu 4 might be analysed by applying line filters to the absolute values of impulse response image whereas the signals received from the sensing zone 12 above the wheel 6 are analysed by applying line filters directly to the impulse response images. Further details of these processes can be found in WO 2009/115799.

As the smaller sensing spaces 10, 12 are associated with particular graphical objects and the available interactions connected with them, the sensing spaces will change as the graphical objects are changed, moved around the screen, removed etc. This illustrates a principle behind the operation that the graphical user interface provides feedback to the touchless interface to influence how it operates: in particular how and from where it looks for inputs and how it processes the signals it receives.

Figure 2:
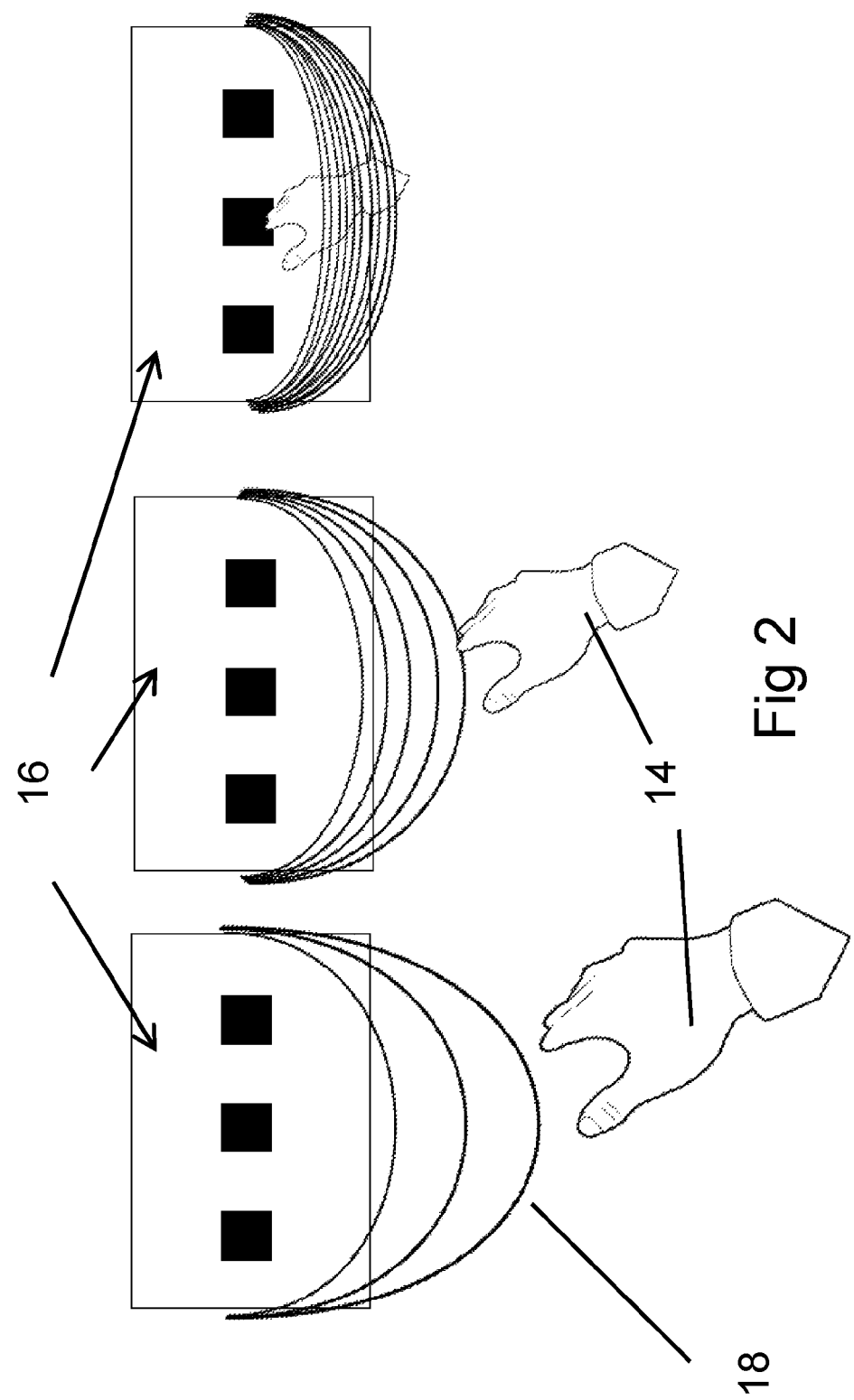
FIG. 2 is a schematic illustration of another embodiment of the invention.

FIG. 2 illustrates another inventive principle which may be used alone or with the other features described herein. In this Figure there is shown a time series in which a user moves his/her hand 14 progressively closer to the screen of a touchless-enabled device 16. When the hand is relatively far away from the device 16, the touchless interface transmits chirps or pings 18 at a relatively low rate as shown in the leftmost diagram. This rate may be too low effectively to interpret a user input in the form of a gesture but just be adequate for determining how far the hand 14 is from the device.

As the user moves his/her hand 14 closer to the device 16 as shown in the centre picture, thereby crossing a predetermined threshold, the device determines that the user's hand is in a predetermined vicinity of the screen and so the transmitter increases the rate at which it sends chirps or pings 18, thereby allowing a greater movement resolution. This may also trigger processing of the received signals to look for user input gestures.

The rightmost picture shows that the transmission rate could be increased further if the user's hand is placed very close to the screen. This could be used to give finer resolution to the user input interpretation or could be used to implement a different form of user input.

The sequence is reversed as the user's hand is withdrawn.

Figure 3:
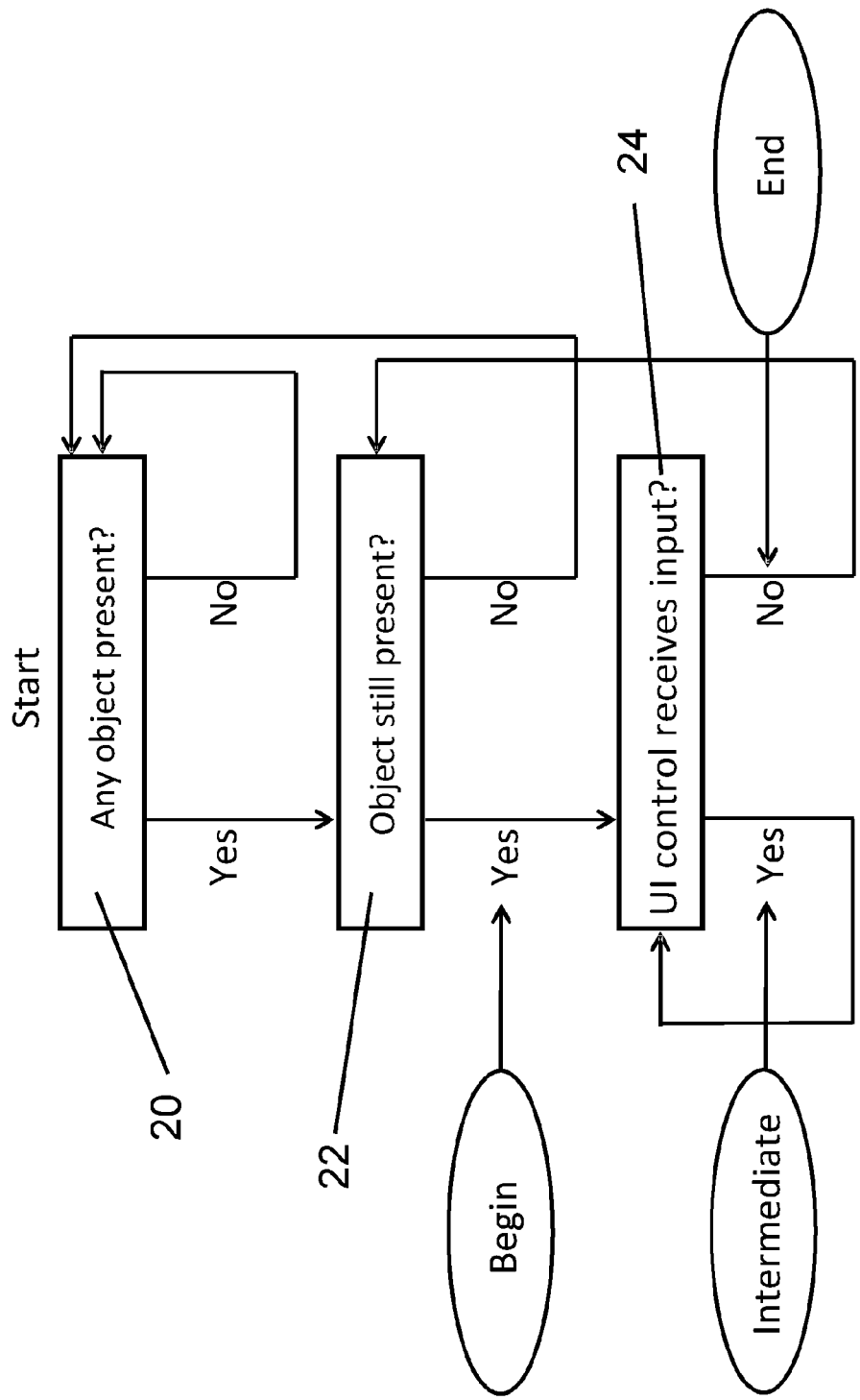
FIG. 3 is a schematic illustration of a further embodiment of the invention.

FIG. 3 is a simple flowchart describing a possible use of an embodiment like that described above with reference to FIG. 2. At the first step 20 the device determines whether an input object is present in the predetermined vicinity of the screen. If an object is detected the device moves to the next step 22. If, at step 22 the object is still present in the vicinity, the device begins a gesture recognition event which includes increasing the ping transmission rate. If a gesture is recognised then the user interface is determined to have received an input at step 24. If it does not, it returns to the previous step 22 to check whether the input object is still in the vicinity. If it is, a user input can still be recognised. If the user's hand has moved away however the device returns to the standby state 20 and the ping transmission rate is reduced again.

It can be appreciated that with arrangements like those described with reference to FIGS. 2 and 3, a high ping rate and a corresponding heavy processing of the received signals is only necessary while a user is actually performing a gesture. This can allow a significant power saving over a device where the input interface is 'always on'. It also reduces interference for other devices as mentioned above.

Although in the description above reference was made to a predetermined vicinity of the screen, this could be equally be implemented with the predetermined vicinity defined relative to a fixed part of the screen or to a graphical object (or part of one) displayed on the screen, the location of which might be variable.

FIG. 4 illustrates a further possible feature which may be used alone or with other features disclosed herein. In this embodiment it can be seen that two graphical objects having user interactions associated with them have different input resolution requirements and so different transmission rates are used. The three buttons shown on the left hand part of the Figure require a relatively low temporal resolution in order to determine a user input (being highlighted or pressed) and so a lower transmission rate is used, whereas the wheel on the right hand side requires greater resolution and so a higher transmission rate is used. Again this illustrates how the nature of the graphical user interface is used to control the operation of the touchless input recognition system to save power and/or increase performance where possible. This can of course be combined with different processing algorithms which will in general have different inherent resolutions.

The invention claimed is:

1. An electronic device including a touchless user interface comprising:
   a transmitting arrangement for transmitting ultrasonic signals,
   a receiving arrangement comprising a plurality of receivers for receiving reflected signals after reflection of said signals from an input object,
   a processing arrangement for determining information regarding the position and/or movement of said input object from said reflected ultrasonic signals to provide a user input to the device; and
   a screen for displaying a graphical object having one or more associated interactions with which a user can interact with said graphical object through a said user input,
   wherein the device is arranged to increase a transmission rate at which the ultrasonic signals are transmitted by the transmitting arrangement thereby allowing a greater detection resolution if said input object is determined to be within a predetermined vicinity of said screen or a graphical object on said screen, and wherein the processing arrangement is arranged to process only signals received by a subset of said receivers and which have been reflected from the input object when it is in a predetermined sensing space associated with the graphical object.

2. A device as claimed in claim 1 arranged to have a first transmission rate when no input object is determined to be within the predetermined vicinity and a second, higher transmission rate when the input object is determined to be within the predetermined vicinity.

3. A device as claimed in claim 1 arranged so that it will only analyse the received signals to determine whether a user input has been made after it has established that an input object is in the predetermined vicinity.

4. A device as claimed in claim 1 arranged to reduce the transmission rate again once the input object is no longer in the predetermined vicinity.

5. A device as claimed in claim 1 wherein the predetermined vicinity is defined relative to a graphical object on the screen, or part thereof, with which the user can interact.

6. A device as claimed in claim 1 arranged to process only reflections from some but not all transmitted signals.

7. A device as claimed in claim 1 arranged to process only signals received within a time constraint.

8. A device as claimed in claim 7 wherein said time constraint is based on the location of the graphical object on the screen.

9. A device as claimed in claim 1 arranged to apply different processing to signals received depending on the type of interaction(s) available.

10. A device as claimed in claim 1 arranged to control the transmitting arrangement to alter the transmission of said signals according to the location of a graphical object on the screen and/or by the available interaction(s) associated with said graphical object.

11. A device as claimed in claim 10 wherein the transmitting arrangement is controlled to alter the rate at which transmissions are made.

12. A device as claimed in claim 10 wherein the transmitting arrangement is controlled to alter which of a plurality of transmitters is used to transmit.

13. A device as claimed in claim 1 arranged to alter the transmission of signals and/or the processing of received signals depending on whether or not said input object is determined to be within a predetermined vicinity of said graphical object.

14. A method of operating an electronic device including a touchless user interface comprising:
    transmitting ultrasonic signals,
    receiving at a plurality of receivers reflected signals after reflection of said ultrasonic signals from an input object,
    processing said reflected ultrasonic signals to determine information regarding the position and/or movement of said input object to provide a user input to the device; and
    displaying on a screen a graphical object having one or more associated interactions with which a user can interact with said graphical object through a said user input,
    wherein a transmission rate at which the ultrasonic signals are transmitted is increased thereby allowing a greater detection resolution if said input object is determined to be within a predetermined vicinity of said screen or a graphical object on said screen, and wherein the step of processing said reflected ultrasonic signals comprises processing only signals received by a subset of said receivers and which have been reflected from the input object when it is in a predetermined sensing space associated with the graphical object.

15. A method as claimed in claim 14 comprising using a first transmission rate when no input object is determined to be within the predetermined vicinity and a second, higher transmission rate when the input object is determined to be within the predetermined vicinity.

16. A method as claimed in claim 14 comprising only analysing the received signals to determine whether a user input has been made after it has established that an input object is in the predetermined vicinity.

17. A method as claimed in claim 14 arranged to reduce the transmission rate again once the input object is no longer in the predetermined vicinity.

18. A method as claimed in claim 14 wherein the predetermined vicinity is defined relative to a graphical object on the screen, or part thereof, with which the user can interact.

19. A method as claimed in claim 14 comprising processing only reflections from some but not all transmitted signals.

20. A method as claimed in claim 14 comprising processing only signals received within a time constraint.

21. A method as claimed in claim 20 wherein said time constraint is based on the location of the graphical object on the screen.

22. A method as claimed in claim 14 comprising applying different processing to signals received depending on the type of interaction(s) available.

23. A method as claimed in claim 14 comprising altering the transmission of signals and/or the processing of received signals depending on whether or not said input object is determined to be within a predetermined vicinity of said graphical object.

24. A non-transitory computer-readable medium comprising computer software having logic or instructions which, when executed, operates an electronic device to:

transmit ultrasonic signals, receive at a plurality of receivers reflected signals after reflection of said ultrasonic signals from an input object, process said ultrasonic reflected signals to determine information regarding the position and/or movement of said input object to provide a user input to the device; and display on a screen a graphical object having one or more associated interactions with which a user can interact with said graphical object through a said user input, wherein a transmission rate at which the ultrasonic signals are transmitted is increased thereby allowing a greater detection resolution if said input object is determined to be within a predetermined vicinity of said screen or a graphical object on said screen, and wherein the step of processing said reflected ultrasonic signals comprises processing only signals received by a subset of said receivers and which have been reflected from the input object when it is in a predetermined sensing space associated with the graphical object.

25. A method as claimed in claim 24 comprising controlling the transmitting arrangement to alter the transmission of said signals according to a location of a graphical object on the screen and/or by the available interaction(s) associated with said graphical object.

26. A method as claimed in claim 25 comprising controlling the transmitting arrangement to alter a rate at which transmissions are made.

27. A method as claimed in claim 25 comprising controlling the transmitting arrangement to alter which of a plurality of transmitters is used to transmit.

* * * * *